United States Patent [19]

Moussavi et al.

[11] Patent Number: 5,434,990
[45] Date of Patent: Jul. 18, 1995

[54] METHOD FOR SERIALLY OR CONCURRENTLY ADDRESSING N INDIVIDUALLY ADDRESSABLE MEMORIES EACH HAVING AN ADDRESS LATCH AND DATA LATCH

[75] Inventors: Robert B. Moussavi, San Diego, Calif.; Jackson L. Ellis, Fort Collins, Colo.

[73] Assignee: NCR Corporation, Dayton, Ohio

[21] Appl. No.: 563,218

[22] Filed: Aug. 6, 1990

[51] Int. Cl.⁶ .............................................. G06F 12/08
[52] U.S. Cl. ..................... 392/425; 364/253; 364/254.8; 364/243.41; 364/DIG. 1
[58] Field of Search ............................. 395/400, 425; 364/DIG. 1, DIG. 2

[56] References Cited

U.S. PATENT DOCUMENTS

| | | | |
|---|---|---|---|
| 3,967,247 | 6/1976 | Andersen et al. | 395/250 |
| 4,056,845 | 11/1977 | Churchill, Jr. | 395/425 |
| 4,168,541 | 9/1979 | DeKarske | 365/49 |
| 4,381,541 | 4/1983 | Baumann, Jr. et al. | 395/425 |
| 4,395,754 | 7/1983 | Fiessel | 395/400 |
| 4,467,419 | 8/1984 | Wakai | 395/425 |
| 4,493,026 | 1/1985 | Olnowich | 395/425 |
| 4,724,518 | 2/1988 | Steps | 395/425 |
| 4,736,293 | 4/1988 | Patrick | 395/425 |
| 4,924,375 | 5/1990 | Fung et al. | 395/425 |
| 5,014,195 | 5/1991 | Farrell et al. | 395/425 |
| 5,047,920 | 9/1991 | Funabashi | 395/425 |
| 5,051,889 | 9/1991 | Fung et al. | 395/425 |
| 5,091,851 | 2/1992 | Shelton et al. | 395/425 |

FOREIGN PATENT DOCUMENTS 0054888 6/1982 European Pat. Off. .
85/04737 10/1985 WIPO .

OTHER PUBLICATIONS

Gaonkar, R., Microprocessor Architecture, Programming, and Applications with the 8085/8080A, Charles E. Merrill Publishing Company, pp. 41–44, 49–51 (1984).

Primary Examiner—Thomas C. Lee
Attorney, Agent, or Firm—Douglas S. Foote

[57] ABSTRACT

A method for reading data from an n-way, set associative cache. n individually addressable memory units are provided, with each of the units storing a plurality of data elements. All n of the units are concurrently addressed to transfer a data element from each of the units to a respective latch, and one of such data elements is selectively transferred from one of the latches. The units are then serially addressed in a predetermined pattern to sequentially transfer data elements out of the units.

4 Claims, 4 Drawing Sheets

METHOD FOR SERIALLY OR CONCURRENTLY ADDRESSING N INDIVIDUALLY ADDRESSABLE MEMORIES EACH HAVING AN ADDRESS LATCH AND DATA LATCH

CROSS-REFERENCE TO RELATED APPLICATIONS

"Computer Memory System", U.S. patent application Ser. No. 563,216, filed concurrently herewith, invented by Edward C. King, Jackson L. Ellis, Robert B. Moussavi and Pirmin L. Weisser, now pending.

"Computer Memory Open Page Bias Method and System", U.S. patent application Ser. No. 563,221, filed concurrently herewith, invented by Edward C. King and F. Vincentinus Vermeer, now pending.

"Computer Memory System", U.S. patent application Ser. No. 563,214, filed concurrently herewith, invented by Edward C. King, Forrest O. Arnold, Jackson L. Ellis, Robert B. Moussavi, Pirmin L. Weisser and F. Vincentinus Vermeer, now abandoned.

"Data Prefetch Method and System", U.S. patent application Ser. No. 563,215, filed concurrently herewith, invented by Pirmin L. Weisser, F. Vincentinus Vermeer and Edward C. King, now pending.

"Method for Merging Data in A Computer Memory System", U.S. patent application Ser. No. 563,219, filed concurrently herewith, invented by Edward C. King, Forrest O. Arnold, Jackson L. Ellis, Robert B. Moussavi, Pirmin L. Weisser and F. Vincentinus Vermeer, now pending.

"Computer Memory System and Method for Cleaning Data Elements", U.S. patent application Ser. No. 563,217, filed concurrently herewith, invented by Jackson L. Ellis.

"Computer Memory System and Method for Enhancing Performance on Cache Overflows", U.S. patent application Ser. No. 563,220, filed concurrently herewith, invented by Jackson L. Ellis, Robert B. Moussavi and Edward C. King, now pending.

The present invention relates to computer cache memories. More particularly, it relates to a mapping for a cache and a method for reading data therefrom.

REFERENCE TO A MICROFICHE APPENDIX

A microfiche appendix is provided herewith. The appendix includes three microfiche having a combined total of 263 frames.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer system's main memory. A high speed memory may employ SRAMs for use as a processor cache memory. The theory behind memory hierarchy is to group code (instructions) and other data to be executed by the system processor in the highest speed memory. Since high speed memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

The physical layout of the cache together with its mapping function impacts the speed and/or complexity of the cache design. For example, the cache can be designed to provide a predetermined number of consecutive data elements in parallel. This arrangement of parallel access provides very fast operation. However, the number of gates is high resulting in an expensive integrated gate structure and high, energy consumption. Alternatively, the cache can be designed to provide consecutive data elements serially. This arrangement requires relatively fewer gates and lower power consumption. However, speed is sacrificed due to the time required to precharge the memory enable line on address changes.

OBJECTS OF THE INVENTION

It is therefore an object of the present invention to provide a new and improved method for reading data from an n-way set associative cache.

It is another object of the present invention to provide a new and improved mapping for a cache.

It is a further object of the present invention to provide a new and improved n-way set associative cache structure.

It is yet another object of the present invention to provide a cache structure requiring relatively few gates, low power consumption, and high speed.

It is yet a further object of the present invention to provide a high speed method for reading data elements from an n-way set associative cache.

SUMMARY OF THE INVENTION

One form of the present invention is a method for reading data from an n-way, set associative cache. n individually addressable memory units are provided, with each of the units storing a plurality of data elements. All n of the units are concurrently addressed to transfer a data element from each of the units to a respective latch, and one of the data elements is selectively transferred from one of the latches. The units are then serially addressed in a predetermined pattern to sequentially transfer data elements out of the units.

DESCRIPTION OF A PREFERRED EMBODIMENT

Figure 1:
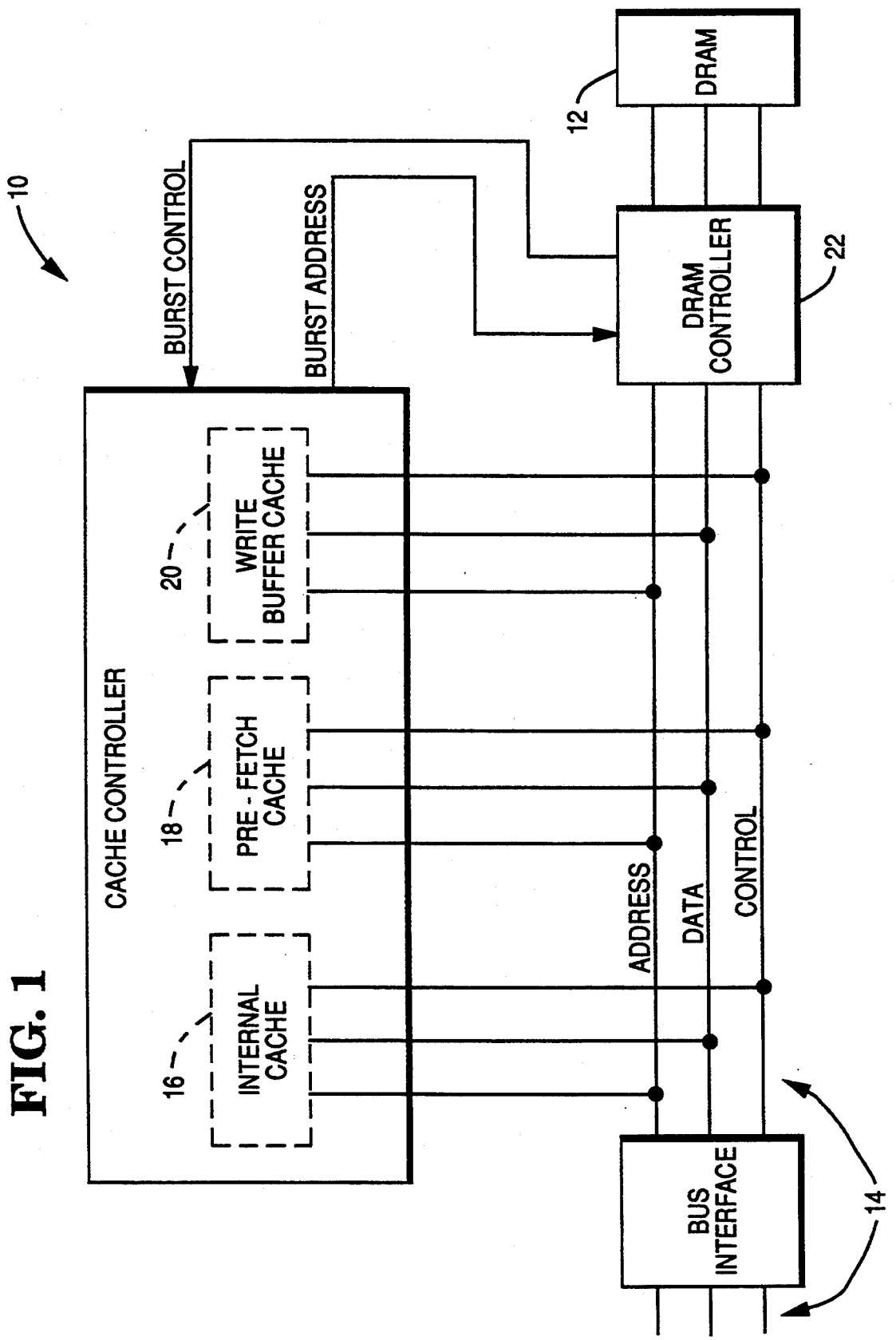
FIG. 1 is a block diagram of a high performance computer memory system.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system (not shown) by a bus 14. Memory system 10 is designed for use with two or more bus masters, although it is operable with a single master. More particularly, it is designed for use with a host processor such as an Intel processor 386, 386sx or 486 in combination with other bus masters or devices which will compete with the host processor for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4 K byte, four-way set associative cache, pre-fetch cache 18 is a 128 byte, direct-mapped cache, and write buffer cache 20 is a 128 byte, two-way set associative cache. Further detail on the structure of internal cache 16 and its novel mapping is discussed below with reference to FIGS. 2A and 2B.

A feature of the caches is that their functionality may be varied depending upon the host processor type (386, 386sx or 486) utilized. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that pre-fetch cache 18 contains solely code data prefetched from DRAM 12. Furthermore, it only prefetches code based on a memory access by the host processor. In operation, whenever the system processor requests code data not already in the prefetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12.

An important feature of the caches is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, for a system employing a 486 system processor, write buffer cache 20 buffers data writes by any bus master other than the system processor. For a system employing a 386 or 386sx system processor, internal cache 16 holds only code data and is a read only cache for the system processor, and write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. DRAM 12 is divided into pages which contain either code or non-code data. A register associated with DRAM 12 is located either in DRAM 12 or DRAM controller 22 and holds the page address of a most recently accessed page. In effect, the system provides a bias towards code pages or non-code pages depending upon the type of processor connected to the system. For example, if the system processor is a 486, the address of the most recently accessed code address page is held in the register. In operation, both code and non-code data pages in DRAM 12 can be randomly accessed. If a code page is accessed on one cycle and a non-code page is accessed on the next cycle, the address of the code page is held in a register while the non-code page is accessed. Immediately after the non-code page access, the address in the register is used to reopen the code page. In contrast, if the system processor is a 386 or 386sx, the address of the most recently accessed non-code address page is held in the register. The combination of selective open page bias, fast page mode accesses and multiple caches provides increased system performance.

Write buffer cache 20 is a two-way set associative cache. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping respective blocks to opposing sets in the two-way set associative cache, increased operational efficiency can be realized. Furthermore, an open page bias in the DRAM for non-code data will effectively be an open page bias for list data. In this manner, operational efficiency is further enhanced.

Figure 2A:
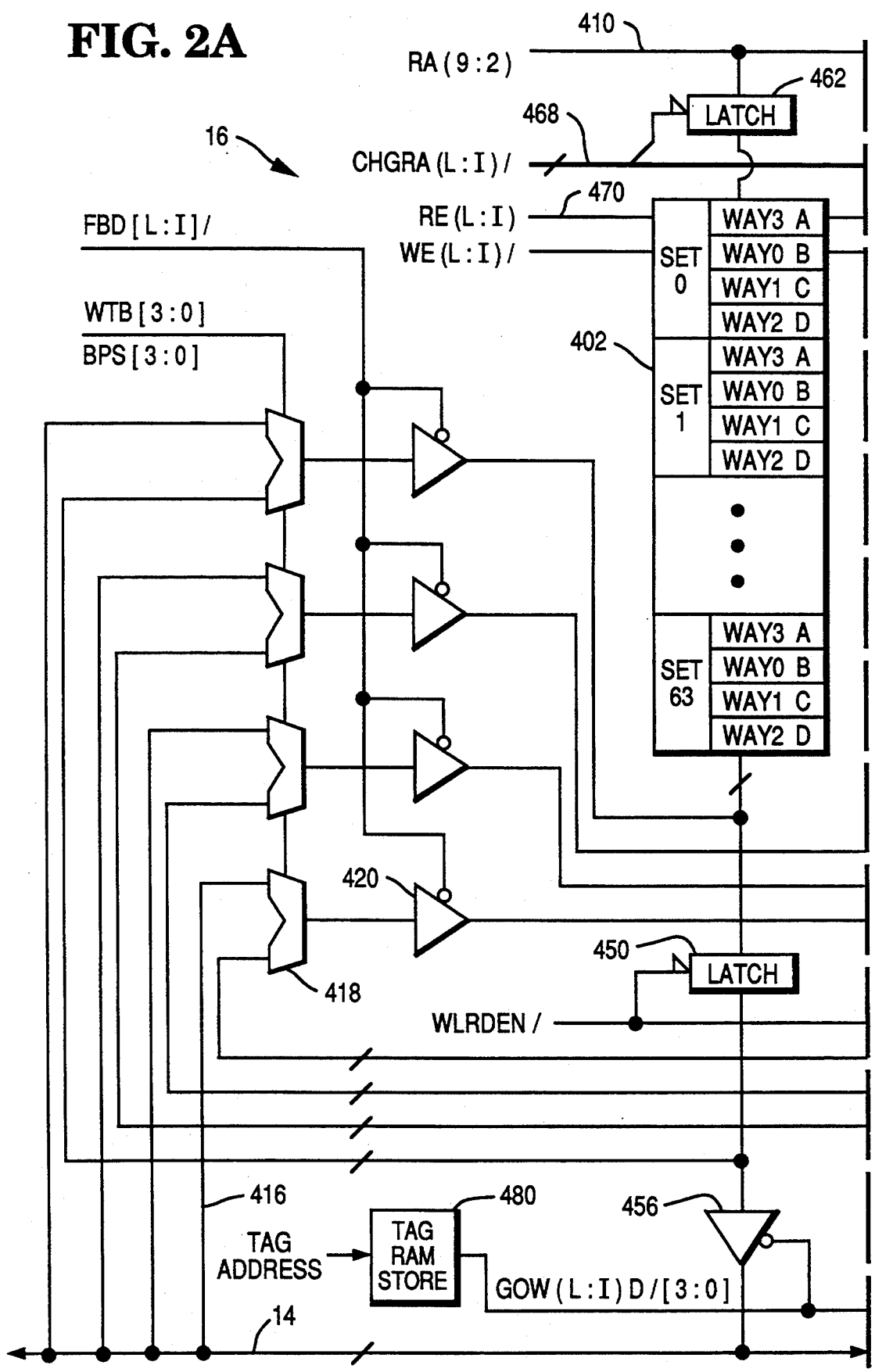
FIGS. 2A and 2B are a diagram of a four-way set associative cache according to one form of the present invention.
Figure 2B:
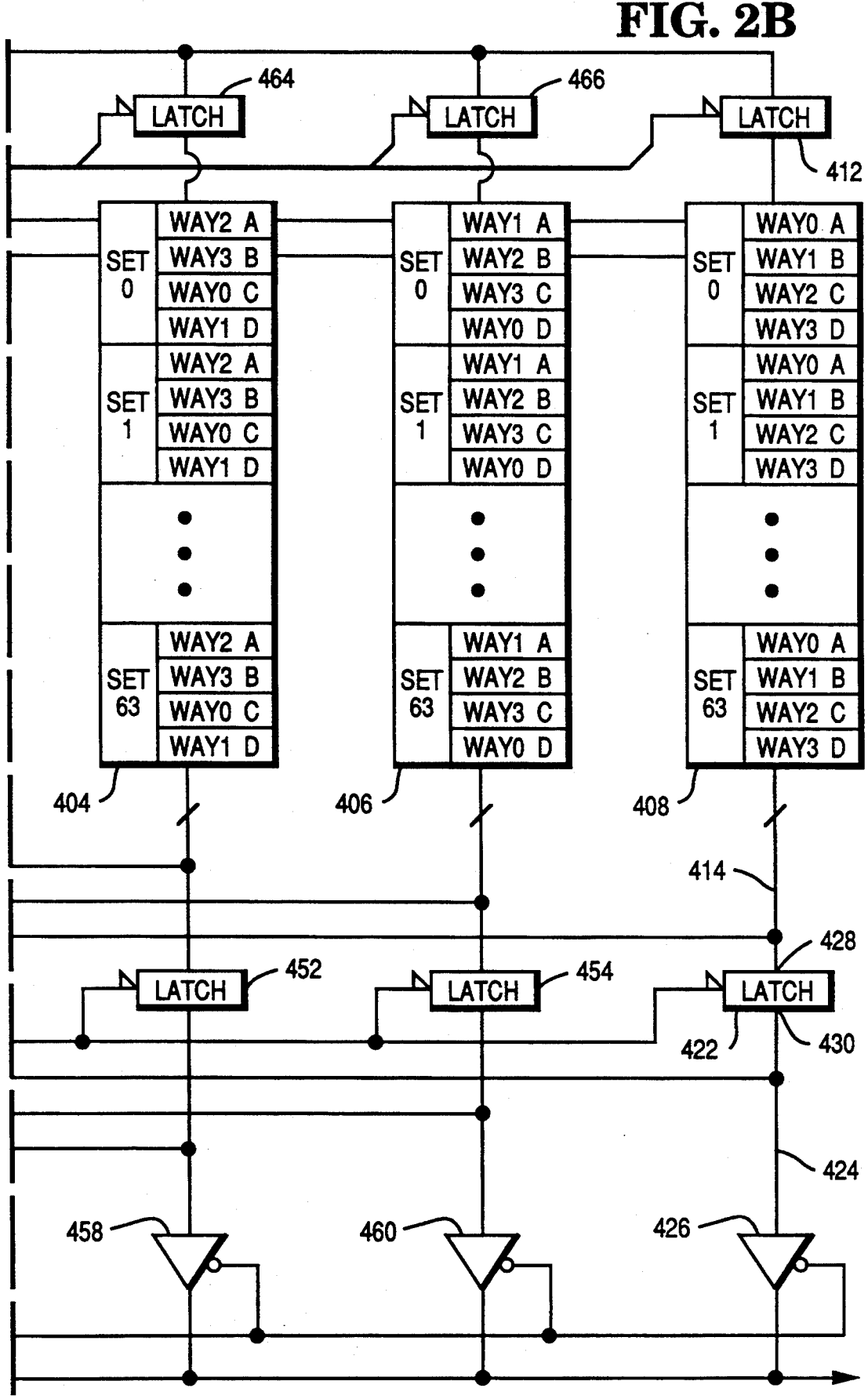

FIGS. 2A and 2B show more detail of cache 16 which is connected to bus 14. As noted previously, cache 16 is a four-way set associative cache in a preferred embodiment, with four memory units 402, 404, 406 and 408. Each memory unit 402, 404, 406 and 408 has a latch 450, 452, 454 and 422, respectively, associated therewith. Each latch 450, 452, 454 and 422 may receive a data element from memory unit 402, 404, 406 and 408, respectively. Tristate devices 456, 458, 460 and 426 are connected between latches 450, 452, 454 and 454, respectively, and bus 14. The data element in a latch 450, 452, 454 or 422 may be transferred out of the latch and onto bus 14 by selectively enabling tristate device 456, 458, 460 or 426, respectively. Address latches 462, 464, 466 and 412 are connected between address lines 410 and memory units 402, 404, 406 and 408, respectively. Address information is provided on address lines 410 and held in latch 462, 464, 466 and/or 412. Each address latch 462, 464, 466 and 412 is connected to one of the control lines 468 for receiving a control signal CHGRA(L:I) to selectively latch an address from bus 410. Each memory unit 402, 404, 406 and 408 is connected to one of the control lines 470. A RAM enable control signal RE(L:I) on lines 470 selectively enables the respective memory unit. The RE(L:I) signal must therefore be asserted on each cache read and must be reset or precharged between reads of data elements.

As will be appreciated by those skilled in the art a four-way set associative cache is first of all set associative. In other words, a given data element may be mapped only into a predetermined set. For example, each set in cache 16 holds 4 double words (a line), so that the first line in system memory maps into set 0, line 2 maps into set 1, . . . line 64 maps into set 63, line 65 maps into set 0, . . . . Thus, line 0, line 65, line 129, line 193, line 257, . . . , all map into set 0 and can only be stored in that set. It will also be appreciated that what is meant by "four-way" is that there are four slots or "ways" within each set where each line can be mapped. Thus, any four of lines 0, 65, 129, 193, 257, . . . can be mapped into set 0. If four such lines are cached and a fifth is to be cached, one of the original four must be overwritten. The designation A, B, C and D sequentially define the double word within a given line. For example, the first double word in a line is A, the second double word is B, the third double word is C and the fourth double word is D.

The organization of cache 16 and its memory units 402, 404, 406 and 408 is an important feature of the present invention. Firstly, it should be noted that the number of memory units (four) is equal to the number of ways (four-way) of the set associative cache. Secondly, each memory unit 402, 404, 406 and 408 is individually addressable. In other words, an address may be selectively loaded into any of address latches 462, 464, 466 or 412 and the associated memory unit 402, 404, 406 or 408 enabled to read a data element. Thirdly, the data elements are arranged so that the same address identifies a data element in each unit from the same set and different way. For example, the first addressable location in memory unit 402 identifies the set 0, way3, A element, the first addressable location in memory unit 404 identifies the set 0, way 2, A element, the first addressable location in memory unit 406 identifies the set 0, way 1, A element, and the first addressable location in memory unit 404 identifies the set 0, way 0, A element. Each data element at the first addressable location is the A element in set 0, but in a different way. Finally, the data elements are arranged so that four sequential addresses in each memory unit identify an element from four different ways. For example, in set 0 of memory unit 402, sequential data elements A, B, C and D are from WAY3, WAY0, WAY1 and WAY2, respectively.

In a set associative cache, it is not known initially in which of the ways a particular data element is located. This information is obtained by comparing the tag portion of an address to addresses stored in a tag RAM 480. The result of the comparison determines whether there is a hit and in which way the data element resides. The particular arrangement of cache 16 and its memory units allows this determination to be made concurrently with the addressing of the memory units and not prior to such addressing. This improves the response time of cache 16 as will be explained more fully below.

Each address provided to cache 16 has a tag address portion and an element address portion. In response to a first request for a data element, the tag portion of the subject address is provided to a tag RAM to determine if there is a hit, if the data is valid and in which way the data element is located. The GOW(L:I)D/[3:0] signal is generated based on a valid tag hit and the way in which the subject data element is located. The element portion of the address (bits 2–9) are provided to all memory units over address bus 410. This element address is latched into latches 462, 464, 466 and 412, and each memory unit 402, 404, 406 and 408 is enabled by the RE(L:I) signal to concurrently address all of the units and transfer a data element from each unit to a respective latch 450, 452, 454 and 422. For example, if the first addressable location in set 0 of the memory units is accessed, the WAY3 A, WAY2 A, WAY1 A and WAY0 A elements are provided to latches 450, 452, 454 and 422. If the desired data element is in cache 16 (a hit) and is valid, the determination of its way will allow one of the tristate devices 456, 458, 460 or 426 to be enabled to selectively transfer the data element from latch 450, 452, 454 or 422 to bus 14. For example, suppose the desired data element is in WAY0, tristate device 426 will be enabled by the GOW(L:I)D/[3:0] signal and the data element provided to bus 14.

As soon as latches 450, 452, 454 and 422 have received their first data element, the enable line 470 for each memory unit 402, 404, 406 and 408 can be precharged in anticipation of the next memory access. If the next data elements to be read from cache 16 are sequential to the first data element read, the sequentially appearing addresses on bus 410 are selectively latched into latches 462, 464, 466 and 412, respectively. The memory units are then serially addressed by applying the appropriate enable signal RE(L:I). The pattern in which the memory units are addressed is predetermined by the location of sequential data elements in the same way. Continuing with the previous example where the set 0, data element WAY0 A was selected: The RE(L:I) enable signal is concurrently precharged and the next address on bus 410 is latched into latch 462. Memory unit 402 is then serially addressed and the WAY0 B data element is sequentially transferred out of memory unit 402 and into latch 450. Tristate device 456 is selectively enabled and data element WAY0 B is transferred onto bus 14. It should now be clear that when one memory unit is being serially addressed, the enable lines for the others may be precharged and an address latched into latch 462, 464, 466 or 412.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 3:
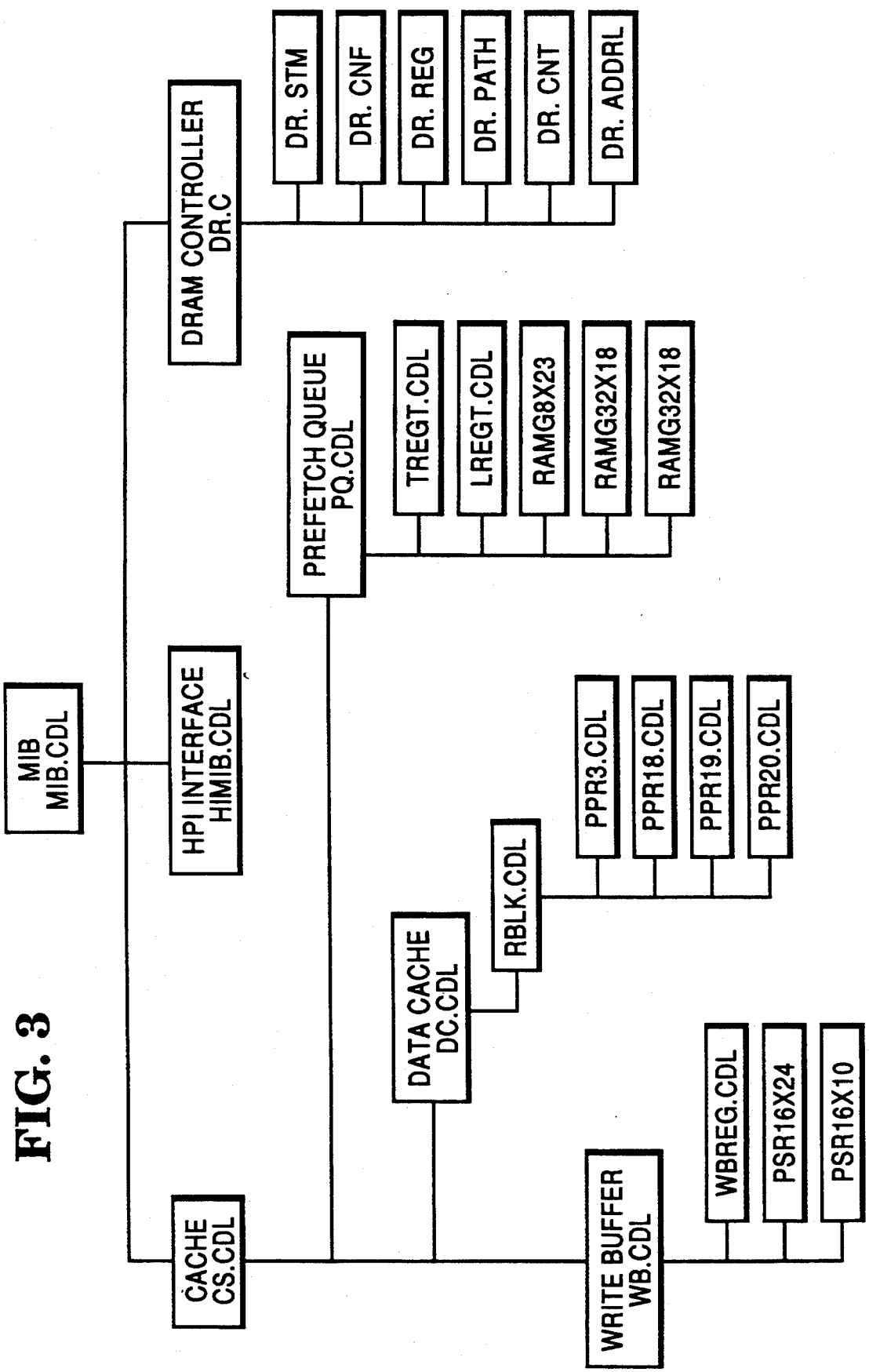
FIG. 3 is a block diagram showing the relationship between modules of the memory system.

FIG. 3 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for transferring data from an n-way, set associative cache having n individually addressable memory units, wherein each of said memory units stores a plurality of data elements, comprising:
   concurrently addressing all n of said units to transfer a data element from each of said units to a respective data latch;
   selectively transferring a first data element from one of said data latches; and
   serially addressing said memory units to sequentially transfer data elements out of respective ones of said memory units;
   wherein each memory unit has an address latch associated therewith, and wherein during said serially addressing step said memory units are addressed one at a time, further comprising during said serially addressing step;
   latching an address in the address latch associated with one of said memory units when a different one of said memory units is being addressed.

2. A method for transferring data from an n-way, set associative cache having n individually addressable memory units, wherein each of said memory units stores a plurality of data elements, and wherein each of said memory units has an enable line, comprising:
   arranging said data elements in each of said memory units so that a single address identifies a data element in each memory unit from a single set and different way;
   arranging said data elements in each of said memory units so that within each memory unit n data elements having sequential addresses are from n different ways;
   concurrently addressing all n of said units to transfer a data element from each of said units to a respective data latch; selectively transferring a first data element from one of said data latches;
   serially addressing said memory units in a predetermined pattern to sequentially transfer a data element from each of said memory units to a respective one of said data latches;
   further transferring each of said sequentially transferred data element from its respective data latch; and
   precharging the enable line for one of said memory units when another of said memory units is being serially addressed;
   wherein each memory unit has an address latch associated therewith, and wherein during said serially addressing step said memory units are addressed one at a time, further comprising during said serially addressing step:
   latching an address in the address latch associated with one of said memory units when a different one of said memory units is being addressed.

3. The method of claim 2 wherein said step of concurrently addressing said units includes:
   generating a first address having a tag address and an element address; and
   using said element address to address all of said units while comparing said tag address to addresses in a tag store to determine if said first data element is in said cache and which way contains said element.

4. The method of claim 3 further comprising:
   generating a signal based on the tag address comparison and using said signal to selectively enable the transfer of the first data element from said one of said latches.

* * * * *